(12) United States Patent
Hwang

(10) Patent No.: US 7,934,840 B2
(45) Date of Patent: May 3, 2011

(54) OPTICAL DEVICE AND PROJECTION SYSTEM COMPRISING THE SAME

(75) Inventor: Ju-seong Hwang, Cheonan-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 961 days.

(21) Appl. No.: 11/633,026

(22) Filed: Dec. 4, 2006

(65) Prior Publication Data

US 2007/0126994 A1 Jun. 7, 2007

(30) Foreign Application Priority Data

Dec. 5, 2005 (KR) .................. 10-2005-0117497
Dec. 5, 2005 (KR) .................. 2005-0117498

(51) Int. Cl.
G03B 21/26 (2006.01)
G03B 21/00 (2006.01)
G03H 1/00 (2006.01)

(52) U.S. Cl. .................. 353/94; 353/122; 359/34

(58) Field of Classification Search .................. 353/94, 353/98–99, 85, 122; 385/901, 129, 146; 362/608, 610, 615, 628–629, 235; 359/34
See application file for complete search history.

(56) References Cited

U.S. PATENT DOCUMENTS

| | | | | |
|---|---|---|---|---|
| 6,371,623 | B1* | 4/2002 | Toyoda | 362/608 |
| 6,960,776 | B2* | 11/2005 | Machi | 250/504 R |
| 7,059,731 | B2* | 6/2006 | Lee et al. | 353/99 |
| 7,088,321 | B1* | 8/2006 | Parker | 345/83 |
| 7,210,815 | B2* | 5/2007 | Imade | 362/234 |
| 7,222,968 | B2* | 5/2007 | Magarill et al. | 353/31 |
| 7,226,185 | B2* | 6/2007 | Dolgin et al. | 362/239 |
| 7,267,441 | B2* | 9/2007 | Lee et al. | 353/31 |
| 7,284,892 | B2* | 10/2007 | Kitamura et al. | 362/622 |
| 7,377,680 | B2* | 5/2008 | Liao et al. | 362/610 |
| 7,431,463 | B2* | 10/2008 | Beeson et al. | 353/94 |
| 2004/0041984 | A1 | 3/2004 | Tani | |
| 2004/0169829 | A1 | 9/2004 | Kwon | |
| 2005/0173719 | A1 | 8/2005 | Yonekubo | |
| 2006/0262514 | A1* | 11/2006 | Conner et al. | 362/19 |

FOREIGN PATENT DOCUMENTS

| | | |
|---|---|---|
| CN | 1383498 | 12/2002 |
| CN | 1525207 | 9/2004 |
| CN | 1588168 | 3/2005 |
| CN | 1655052 | 8/2005 |
| JP | 2002-023259 | 1/2002 |
| JP | 2002-372677 | 12/2002 |
| JP | 2003-330109 | 11/2003 |
| JP | 2005-070443 | 3/2005 |
| KR | 100324612 | 2/2002 |
| KR | 1020030052704 | 6/2003 |
| KR | 1020050078290 | 8/2005 |
| WO | WO 01/84229 | 11/2001 |

* cited by examiner

Primary Examiner — Tony Ko
Assistant Examiner — Jori Reilly-Diakun
(74) Attorney, Agent, or Firm — Roylance, Abrams, Berdo & Goodman, L.L.P.

(57) ABSTRACT

An optical device comprises a light source unit comprising a plurality of light sources, a light mixing unit that is formed on the light source unit and comprises a light guiding part guiding light emitted from each light source, and a light mixing part mixing the guided light. A supporter supports the light mixing unit to be spaced from the light source unit. A small-sized optical device is provided having an enhanced light efficiency and a projection system having the same.

26 Claims, 14 Drawing Sheets

OPTICAL DEVICE AND PROJECTION SYSTEM COMPRISING THE SAME

CROSS-REFERENCE TO RELATED APPLICATIONS

This application claims the benefit under 35 U.S.C. §119(a) of Korean Patent Application No. 2005-0117497, filed on Dec. 5, 2005, in the Korean Intellectual Property Office, and of Korean Patent Application No. No. 2005-0117498, filed on Dec. 5, 2005, in the Korean Intellectual Property Office, the entirety of both of which are hereby incorporated by reference for all purposes as if fully set forth herein.

BACKGROUND OF THE INVENTION

1. Field of the Invention

The present invention relates to an optical device and a projection system comprising the same. More particularly, the present invention relates to an optical device and a projection system comprising the same using a light emitting diode.

2. Description of the Related Art

Generally, a projection system enlarges and projects an image implemented by a display device on a screen and then provides a large sized image. In the projection system, the image is implemented by an optical system comprising a light source for emitting light, an illuminating system for collecting the light emitted from the light source, a display device for implementing an image by the provided light from the illuminating system and a projection lens system for projecting the light implemented by the display device on the screen.

Generally, the illuminating system comprises a collimator for collimating each light provided by RGB light sources, a plurality of filters for filtering each light and thus composing the filtered light and a light tunnel apparatus. The illuminating system becomes heavy due to many large components being mounted therein. Accordingly, manufacturing costs of the entire projection lens system increases. Thus, more effort is required to assemble and manufacture a small projection system.

Also, there is a probability of errors occurring while assembling the filter, mirrors and lenses corresponding to the respective RGB light source. Also, replacement of the illuminating system is difficult.

Accordingly, a need exists for an improved optical device that enhances light efficiency while miniaturizing the size of the optical device.

SUMMARY OF THE INVENTION

Accordingly, it is an object of the present invention to provide a small-sized optical device having enhanced light efficiency and a projection system having the same.

Also, it is another object of the present invention to provide an optical device having reduced manufacturing costs and a projection system having the same.

The foregoing and/or other aspects of exemplary embodiments of the present invention may be achieved by providing an optical device comprising a light source unit comprising a plurality of light sources; a light mixing unit that is formed on the light source unit and comprises a light guiding part for guiding light emitted from each light source and a light mixing part for mixing the guided light; and a supporter for supporting the light mixing unit to be spaced from the light source unit.

According to an exemplary embodiment of the present invention, the light guiding part forms a single body with the light mixing part.

According to an exemplary embodiment of the present invention, the light guiding part comprises a plurality of incident surfaces corresponding to each light source.

According to an exemplary embodiment of the present invention, the light guiding part comprises an incident surface in which an aperture is formed.

According to an exemplary embodiment of the present invention, the light guiding part has a tapered shape.

According to an exemplary embodiment of the present invention, the light guiding part is shaped like one of a circular truncated cone shape and a polygonal truncated cone.

According to an exemplary embodiment of the present invention, a concave part having a circular cone shape and a polygonal cone shape is formed on an incident surface of the light guiding part.

According to an exemplary embodiment of the present invention, the light mixing part comprises one of a pillar shape, a polygonal pillar shape, a circular truncated cone shape and a polygonal truncated cone shape.

According to an exemplary embodiment of the present invention, the light mixing part comprises an air layer.

According to an exemplary embodiment of the present invention, the light mixing part further comprises a mirror from which light is reflected.

According to an exemplary embodiment of the present invention, the light mixing part comprises at least one of polymetamethylacrylate (PMMA) and polycarbonate (PC).

According to an exemplary embodiment of the present invention, the light source unit comprises a red light source, a blue light source and a green light source.

According to an exemplary embodiment of the present invention, the light sources are arranged in a shape of a circle or a polygon.

According to an exemplary embodiment of the present invention, the light sources are arranged in a rectangular shape and the number of the green light sources is as many as double that of the blue or red light source.

According to an exemplary e embodiment of the present invention, the light source comprises one of a light emitting diode (LED) and a laser diode (LD).

The foregoing and/or other aspects of the present invention may be achieved by providing an optical device, comprising a light source unit comprising a plurality of light sources; a light mixing part that is formed on the light source unit and shaped like one of a circular truncated cone and a polygonal truncated cone formed with a concave part having one of a circular cone shape and a polygonal cone shape being formed as an incident surface of the light mixing part; and a supporter for supporting the light mixing part to be spaced from the light source unit.

The foregoing and/or other aspects of the present invention may be achieved by providing an optical device comprising a light tunnel part shaped like a tube and comprising an incident surface and an emitting surface; and a light source unit comprising a plurality of light sources formed in contact with the incident surface.

According to an exemplary embodiment of the present invention, an inner wall surface of the light tunnel part comprises a mirror.

According to an exemplary embodiment of the present invention, the light sources are arranged in a shape of a circle or a polygon.

The foregoing and/or other aspects of the present invention may be achieved by providing a projection system comprising an illuminating system comprising a light source, a display device for receiving light from the illuminating system and implementing an image, and a projection lens system for enlarging and projecting the implemented image by the display device and a screen displaying the projected image. The illuminating system comprises an optical device comprising a light source unit comprising a plurality of light sources, a light mixing unit which is formed on the light source unit and comprises a light guide part guiding light emitted from each light source and a light mixing part mixing the guided light, and a supporter for supporting the light mixing unit to be spaced from the light source unit.

According to an exemplary embodiment of the present invention, the display device comprises one of a DMD, an LCOS device and an LCD device.

According to an exemplary embodiment of the present invention, the projection system further comprises a light direction controller that guides light entering into the illuminating system to the display device and transfers an image implemented by the display device to the projection lens system.

According to an exemplary embodiment of the present invention, when the display device is a DMD, the light direction controller comprises at least one of a total reflective prism, an objective lens and a mirror.

According to an exemplary embodiment of the present invention, when the display device comprises one of an LCD device and an LCOS device, the light direction controller comprises a light polarization divider.

According to an exemplary embodiment of the present invention, the light direction controller further comprises a collimator that is provided in front of the display device.

It is to be understood that both the foregoing general description and the following detailed description are exemplary and explanatory and are intended to provide further explanation of the invention as claimed.

Other objects, advantages and salient features of the invention will become apparent from the following detailed description, which, taken in conjunction with the annexed drawings, discloses exemplary embodiments of the invention.

BRIEF DESCRIPTION OF THE DRAWINGS

The above and/or other aspects and advantages of the prevent invention will become apparent and more readily appreciated from the following description of the exemplary embodiments, taken in conjunction with the accompany drawings, in which.

Throughout the drawings, like reference numerals will be understood to refer to like parts, components and structures.

DETAILED DESCRIPTION OF EXEMPLARY EMBODIMENTS

Reference will now be made in detail to the embodiments of the present invention, examples of which are illustrated in the accompanying drawings. The exemplary embodiments are described below so as to explain the present invention by referring to the figures.

Figure 1A:
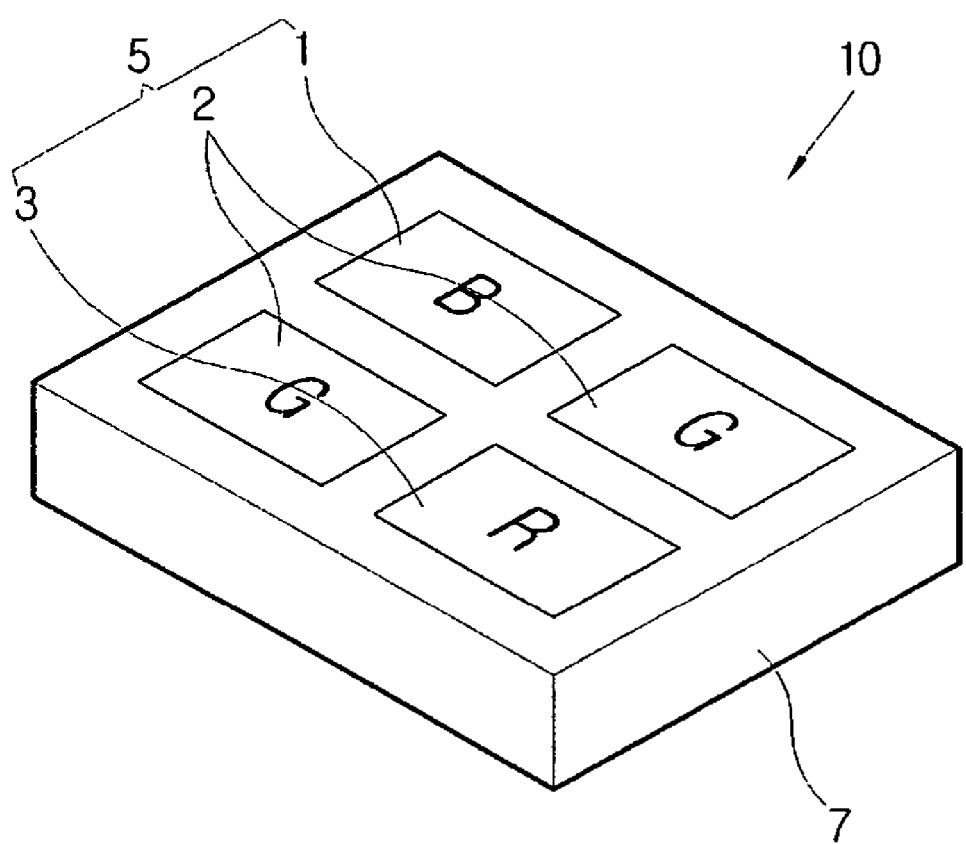
FIG. 1A is a perspective view of a light source unit according to a first exemplary embodiment of the present invention.
Figure 1B:
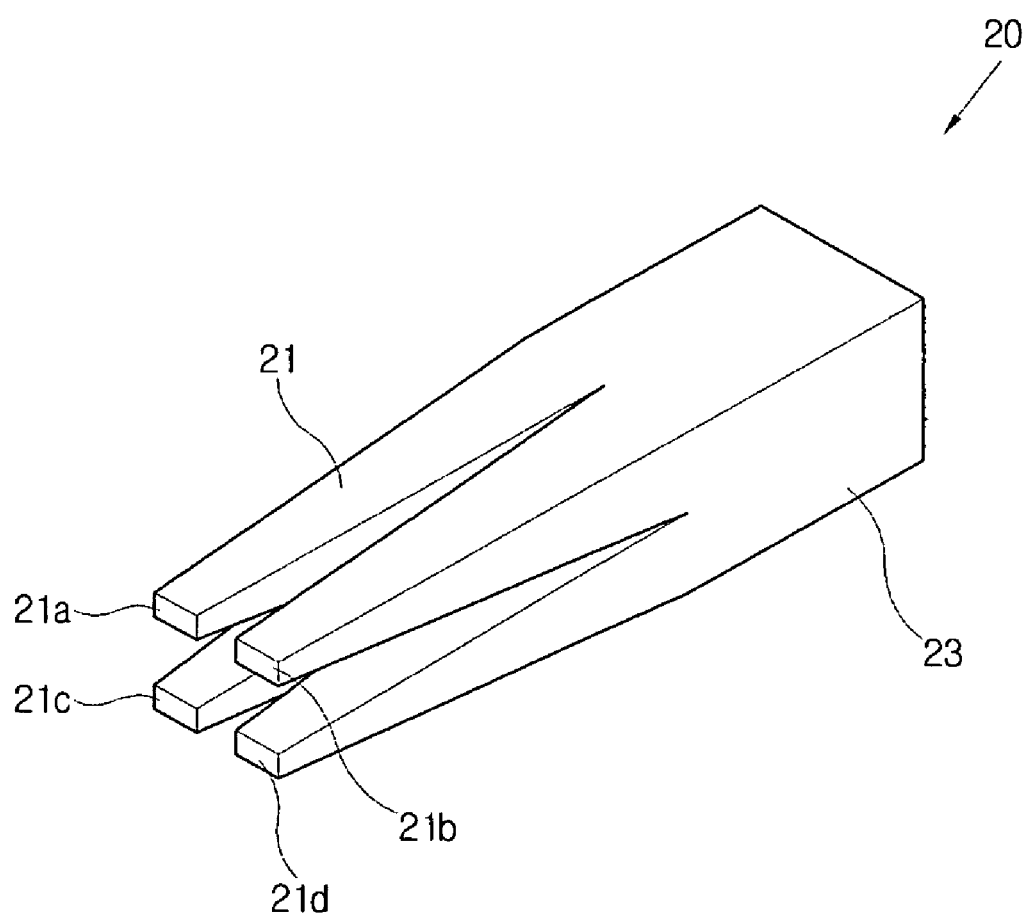
FIG. 1B is a perspective view of a light mixing unit according to an exemplary embodiment of the present invention.
Figure 1C:
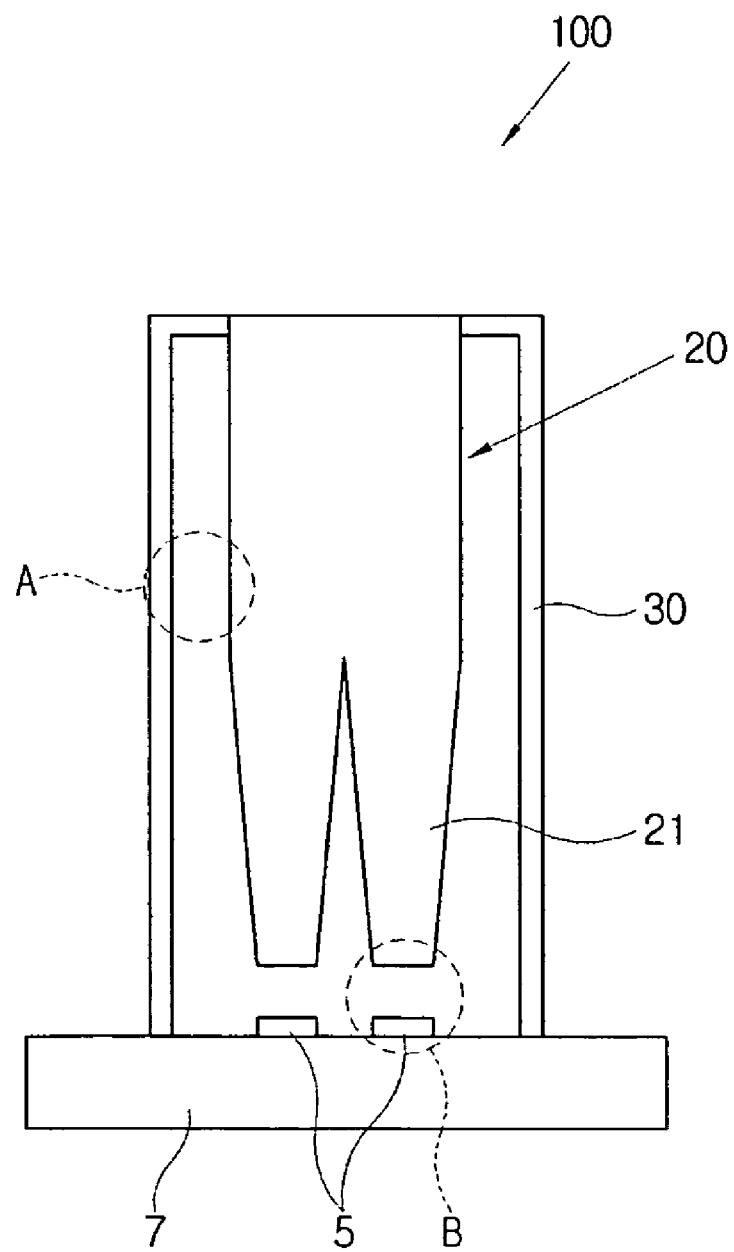
FIG. 1C is a schematic view of an optical device according to a first exemplary embodiment of the present invention.

An optical device according to a first exemplary embodiment of the present invention is described referring to the FIGS. 1A through 1C. FIG 1A illustrates a light source unit 10. FIG. 1B illustrates a light mixing unit 20. FIG 1C is a sectional view of an optical device 100.

As shown therein, the optical device 100 according to a first exemplary embodiment of the present invention comprises the light source unit 10, the light mixing unit 20 and a supporter 30 supporting the foregoing elements. The optical device 100 is not limited to the foregoing functions because the optical device 100 is employed in various optical systems to mix and collect light having different colors, as in an illuminating system used in a projection system.

The light source unit 10 comprises a plurality of the light sources 1, 2, 3 and 5, and a light source circuit board 7 in which the light sources 5 are mounted and provide light having different colors to the light mixing unit 20.

The light sources 5 comprise the blue light source 1 emitting blue light, the green light source 2 emitting green light and the red light source 3 emitting red light. The light sources 5 are arranged in a rectangular shape. The light source 10 according to the first exemplary embodiment comprises the green light source 2 having as many as double the blue light source 1 or the red light source 3. The light source unit 10 comprises two of the green light source 2 corresponding to one blue light source 1 and one red light source 3 in consideration of a low brightness of the green light source 2. The number of each light source 5 and the ratios between the respective light sources 1, 2 and 3 may vary. The light source 5 may comprise one of a light emitting diode (LED) and a laser diode (LD).

Also, an arrangement of the light sources 5 comprised of the light source unit 10 is variable according to light quantity and a characteristic of light, and thus does not limit the aforementioned configuration. For example, the light sources 5 may be arranged in a polygonal shape without a circular shape or a rectangular shape.

Also, colors of light emitted from the light source 5 may be modified according to the optical system in which the optical device 100 is used, and a light source emitting cyan, magenta and yellow light or a white light source may be used in the optical system.

The light source circuit board 7 provides a predetermined power source to the light source 5 and comprises a driver in which a circuit is formed to control the light source 5.

The light mixing unit 20 shown in FIG. 1B is provided on an upper part of the light source unit 10, as shown in FIG. 1C, and collects and mixes light generated from the light source unit 10. The light mixing unit 20 comprises a light guiding part 21 corresponding to the respective light sources 1, 2 and 3 and a light mixing part 23 for mixing the guided light. The light guiding part 21 and the light mixing part 23 are incorporated into one body and preferably comprise polymetamethylacrylate (PMMA), polycarbonate (PC) or other suitable materials.

The light guiding part 21 has a plurality of incident surfaces 21a through 21d corresponding to the respective light sources 1, 2 and 3. A plurality of the light guiding parts 21 are provided to respectively guide light having different colors. The plurality of light guiding parts 21 form a single body with the light mixing part 23. Dividing the light guiding part 21 for the respective light sources 1, 2 and 3 increases the probability of achieving a total reflection of light because each light passes through the light guiding part 21 having a larger surface area. Accordingly, light efficiency increases. The respective light guiding parts 21 and the entire light guiding part 21 have a tapered shape in which a section thereof increases toward a progressive direction of light. The tapered shape is similar to a truncated quadrangular pyramid.

To facilitate light collection, the incident surfaces 21a through 21d of the light guiding part 21 preferably have a shape corresponding to an arrangement of the respective light sources 1, 2 and 3. Accordingly, the incident surfaces 21a through 21d according to the first exemplary embodiment have a tetragonal shape corresponding to the light source 5 having a tetragonal shape.

The light mixing part 23 incorporated into a single body with the light guiding part 21 mixes the guided light having different colors. The light mixing part 23 according to an exemplary embodiment has a square pillar shape, but is not limited thereto. Alternatively, the light mixing part 23 may have various shapes including a substantially cylindrical shape. Also, the light mixing part 23 may have a tapered shape in which a horizontal section thereof increases toward an emitting direction of light. The length of the light mixing part 23 may be variably modified according to a mixing degree of light and light quantity as necessary.

FIG. 1C is a sectional view of the optical device 100. The supporter 30 supports the light source unit 10 (FIG. 1A) and the light mixing unit 20. As shown in FIG. 1C, a lateral side A of the light mixing part 23 (FIG. 1B) does not contact the supporter 30. The light mixing unit 20 is spaced from the light source unit 10 by a predetermined interval B. The supporter 30 supports the light mixing unit 20 to be spaced from the light source unit 10 at a predetermined interval and partially contacts the light mixing unit 20. The light mixing unit 20 may be supported and connected by a guide or a groove formed in the supporter 30.

Light entering into the light mixing unit 20 is repeatedly reflected in the lateral side of the light mixing unit 20 and is then emitted to an upper part of the light mixing unit 20. Light efficiency decreases due to light diffracted to an external part of the light mixing unit 20. Accordingly, a part A contacted with the light mixing unit 20 is constituted of a sparse matter, such as an air layer, so that the light is not refracted and is substantially completely reflected. Thus, the supporter 30 is contacted with an upper edge of the light mixing unit 20 and is spaced from the lateral side thereof to be connected with the light mixing unit 20.

Also, the light source 5 and the light mixing unit 20 are not contacted and spaced from each other to substantially prevent the transfer of heat generated from the light source 5 to the light mixing unit 20. When the two units 10 and 20 contact each other, a bubble may be generated between the two units 10 and 20 or the light source 5 may be damaged because a coefficient of thermal expansion of the light source 5 is different than that of the light mixing unit 20. Accordingly, the supporter 30 supports the light mixing unit 20 to be spaced from the light source 5.

Figure 2:
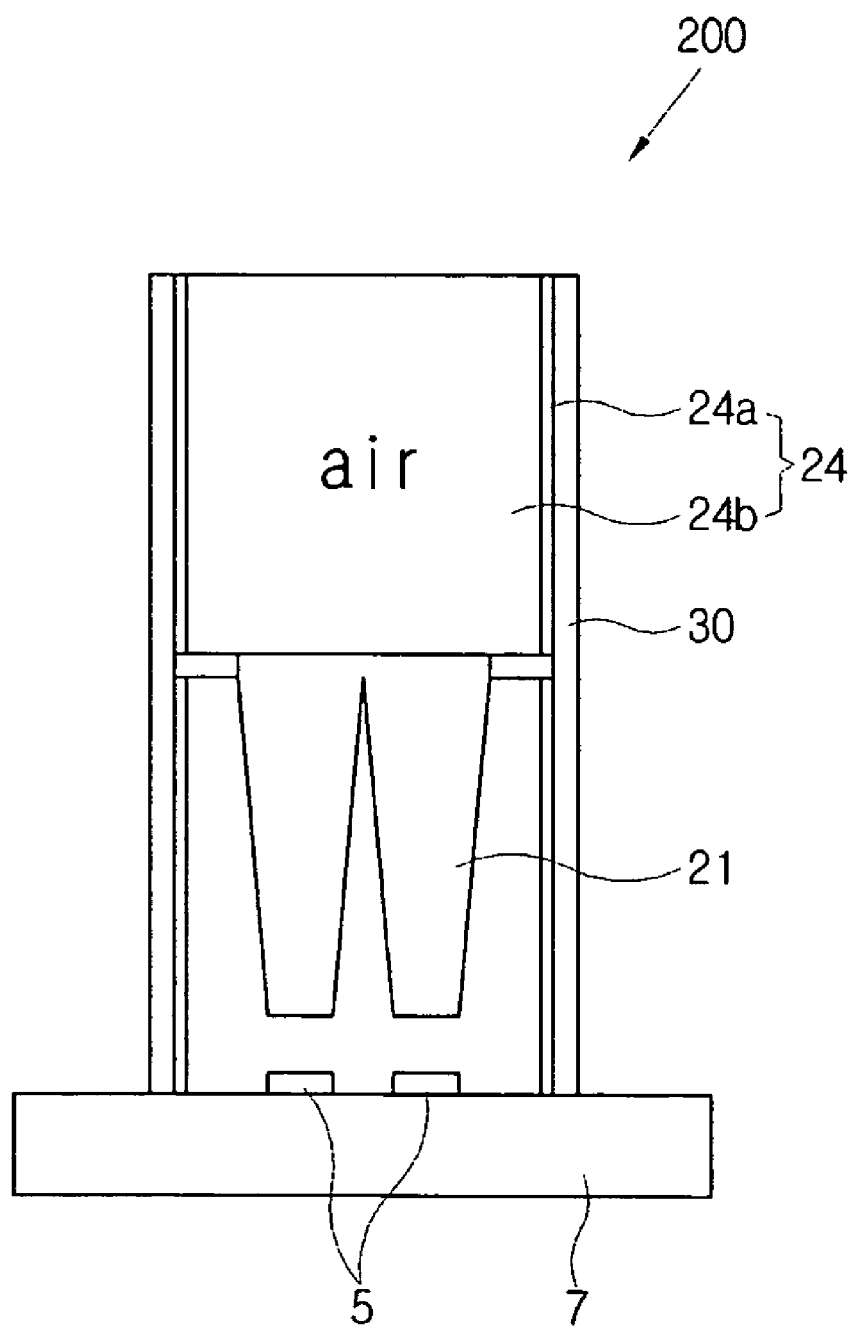
FIG. 2 is a schematic view of an optical device according to a second exemplary embodiment of the present invention.

FIG. 2 is a schematic view of an optical device 200 according to a second exemplary embodiment of the present invention. As shown in FIG. 2, an optical device 200 according to the second exemplary embodiment of the present invention comprises the same elements as the optical device 100 according to the first exemplary embodiment except for a light mixing part 24. Accordingly, explanation of the similar elements is omitted.

A light mixing part 24 comprises a light tunnel including an air layer 24a. A mirror 24b is formed on a lateral side of the light tunnel. Light induced from a light guiding part 21 is mixed at the air layer 24a. Also, light progressed on the lateral side is reflected by the mirror 24b and is then guided to an upper part. The light mixing part 24 according to the second exemplary embodiment uniformly collects light by using the front reflection from the mirror 24b.

Figure 3:
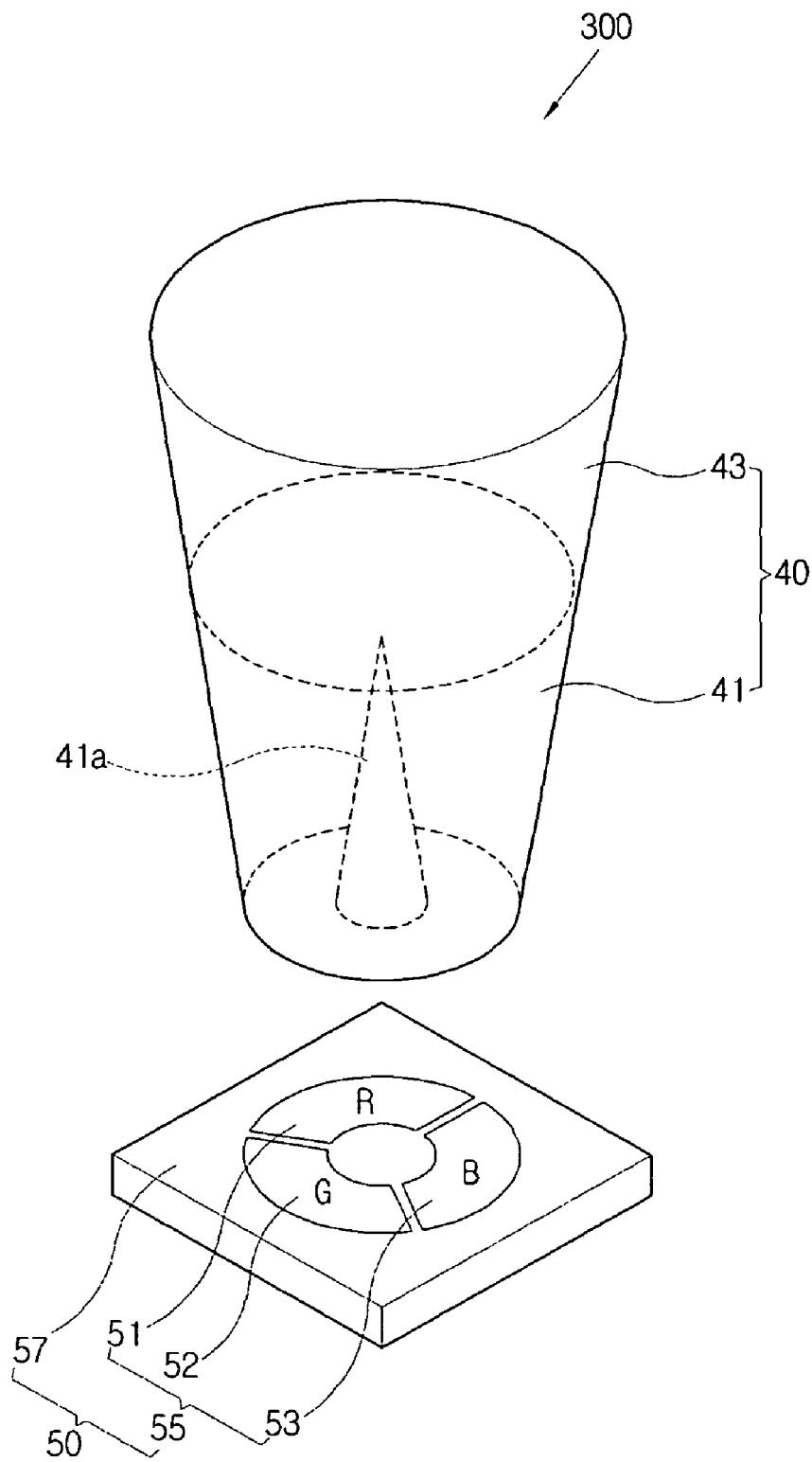
FIG. 3 is a schematic view of an optical device according to a third exemplary embodiment of the present invention.

FIG. 3 is a schematic view of an optical device 300 according to a third exemplary embodiment of the present invention. As shown in FIG. 3, an optical device 300 according to the third exemplary embodiment comprises a light mixing unit 40 having a circular truncated cone shape and a light source 55 arranged in a substantially circumferential shape.

A light source unit 50 comprises the light source 55 having a substantially donut shape in which a red light source 51, a green light source 52 and a blue light source 53 are distributed in substantially the same size, and a light source circuit board 57 in which the light source 55 is mounted. Alternatively, arrangement of the light source 55 may vary.

The light mixing unit 40 has a shape in which the vertex of a cone is truncated. The light mixing unit 40 comprises a light guiding part 41 in which a concave part 41a is formed and a light mixing part 43 forms a single body with the light guiding part 41 and has a tapered shape in which a transverse section thereof increases toward the upper part. The light guiding part 41 has an incident surface in which an aperture is formed by the concave part 41a. Also, the aperture substantially corresponds to a part in which the light source 55 is not formed.

A difference between the optical device 300 according to the third exemplary embodiment and the optical device 100 according to the first exemplary embodiment is whether the light guiding part 41 is diverged by respective light sources. In the optical device 300 according to the third exemplary embodiment, light is guided by each color in the center part of the light guiding part 41 due to the concave part 41a. However, the light guiding part 41 is not diverged between adjacent light sources 51 and 52, 52 and 53, 53 and 51.

A section of the light mixing part 43 is substantially circular. Alternatively, the section of the light mixing part 43 may be polygonal, such as a tetragon. The light mixing part 43 may comprise the air layer similar to the second exemplary embodiment.

Figure 4:
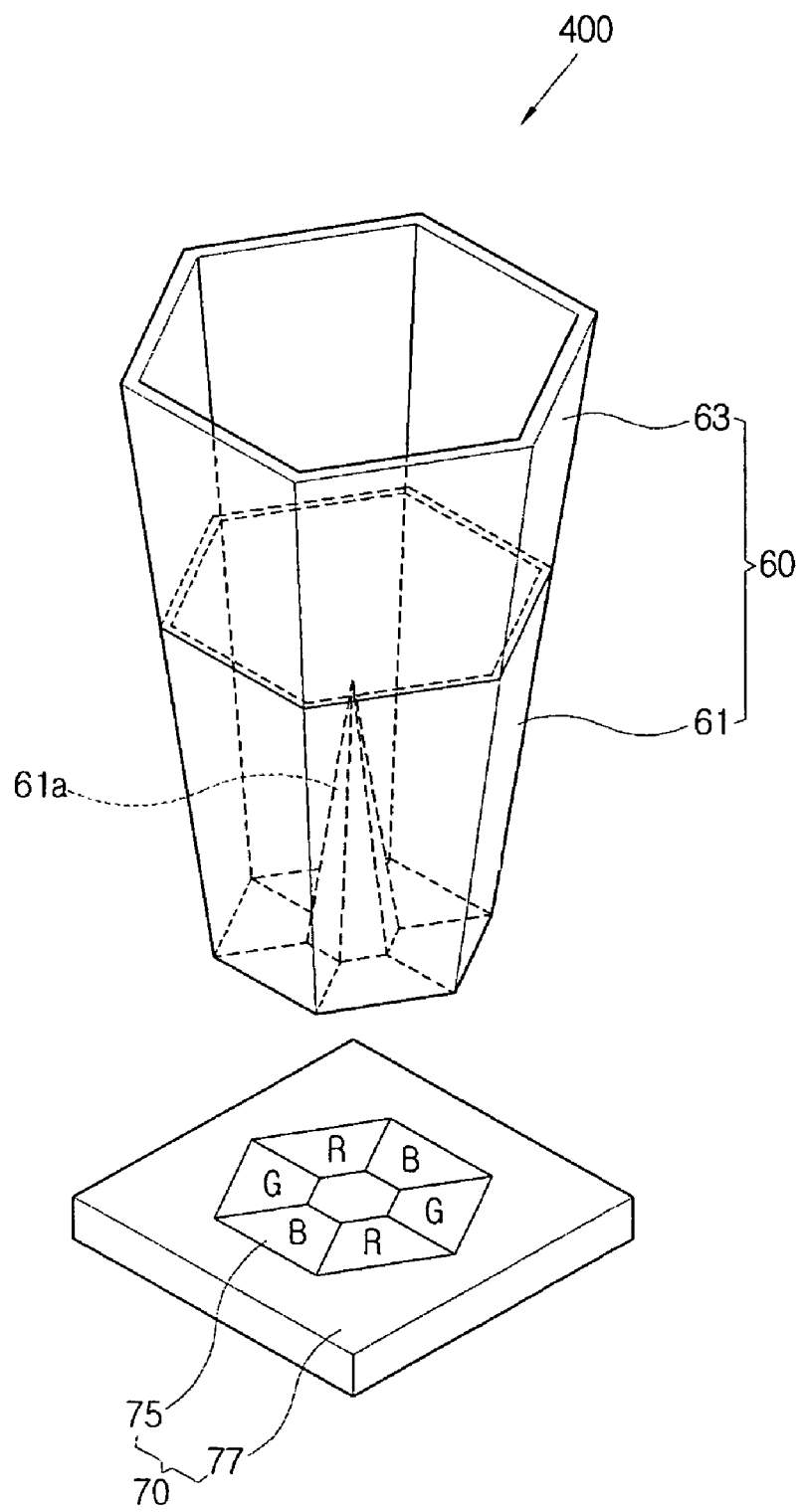
FIG. 4 is a schematic view of an optical device according to a fourth exemplary embodiment of the present invention.

FIG. 4 is a schematic view of an optical device 400 according to a fourth exemplary embodiment of the present invention. As shown therein, an optical device 400 according to the fourth exemplary embodiment comprises a light source unit 70 having a light source 75 arranged in a hexagonal shape and a light mixing unit 60 having a hexagonal pillar shape.

The light source 75 is arranged on a light source circuit board 77 to have a hexagonal shape in which a red light source, a green light source and a blue light source having a trapezoid shape are adjacently arranged. The light source 75 is not arranged in the center part of the hexagonal shape so that the center part corresponds to an aperture formed on an incident surface of a light guiding part 61.

The light guiding part 61 has a truncated hexagonal cone shape in which a concave part 61a is formed in the center, similar to the light guiding part 41 of the third exemplary embodiment. Also, the light guiding part 61 is not diverged about each light source 75, respectively.

A section of the light guiding part corresponds to the arrangement of the light source.

The inner part of the light mixing part 63 comprises the air layer similar to the light mixing part 24 of the second exemplary embodiment in which the mirror is formed on an inner lateral side for reflecting light.

Figure 5:
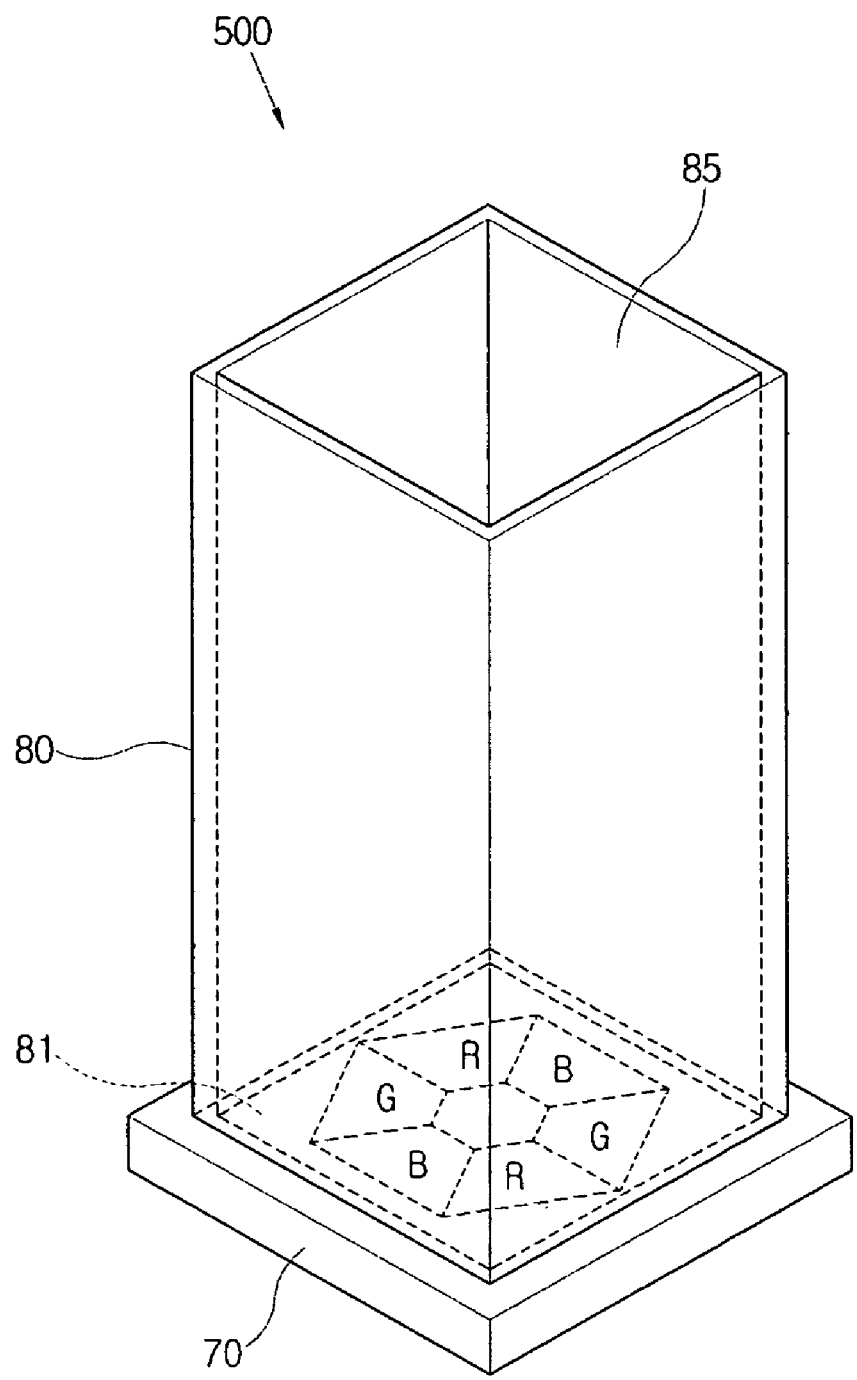
FIG. 5 is a schematic view of an optical device according to a fifth exemplary embodiment of the present invention.

FIG. 5 is a schematic view of an optical device 500 according to a fifth exemplary embodiment of the present invention. An optical device 500 according to the fifth exemplary embodiment comprises the light tunnel part 80 shaped like a tube and having a light incident surface 81 and a light emitting surface 85, and a light source unit 70 having a plurality of light sources and formed in contact with the light incident surface 81.

The light tunnel part 80 has a substantially hollow tube shape and the mirror is formed on an inner lateral side thereof. Accordingly, the mirror reflects light entering into the light tunnel part 80 and then mixes the reflected light. The light tunnel part 80 may have an angular pillar shape as alternatively to the square pillar shape. Also, the light source may have various arrangements, such as a circle, a hexagon, a nonagon, a trapezoid, a rectangle, and the like.

Figure 6:
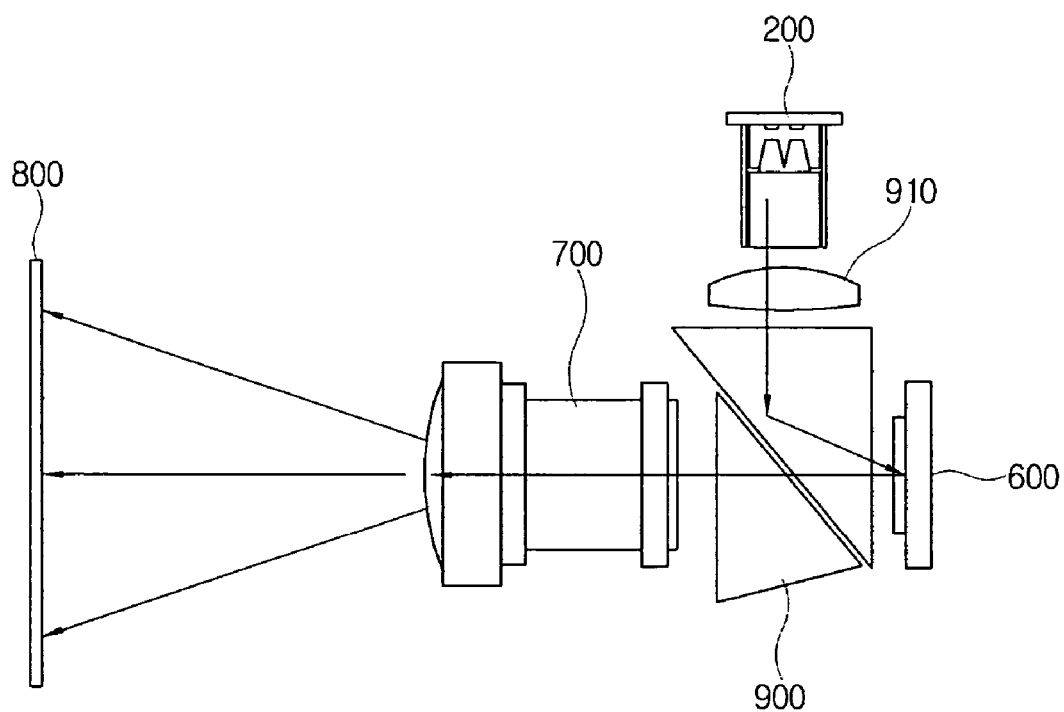
FIG. 6 is a schematic view of a projection system comprising the optical device according to the second exemplary embodiment of the present invention.

FIG. 6 is a schematic view of a projection system comprising the optical device according to the second exemplary embodiment of the present invention. As shown in FIG. 6, the projection system comprises the optical device 200, a digital micromirror device (DMD) 600 as a display device, a light direction controller 900, a projection lens system 700 and a screen 800.

The optical device 200 is illustrated in the second exemplary embodiment and thus a redundant explanation thereof is omitted. Light emitted from the optical device 200 is collected in a collimator 910 and is provided to the DMD 600 through the light direction controller 900. In the optical device 200 according to an exemplary embodiment of the present invention, a light source system and an illuminating system are coupled to a simple device. The optical device 200 mixes and collects red, green and blue light emitted from the light source.

Miniaturization of the projection system may be possible by the compact optical device 200 having a small volume. Also, assembling and replacing the illuminating system is simple. Additionally, the optical device 200 according to an exemplary embodiment of the present invention comprises the light mixing part to enhance light efficiency in spite of the miniaturization thereof.

The light direction controller 900 guides the light emitted from the optical device 200 to the DMD 600 and transfers an image implemented by the DMD 600 to the projection lens system 700. The light direction controller 900 comprises a total reflective prism of which an incident surface is a convexly spherical surface. The light direction controller 900 is not so limited as the total reflective prism and may alternatively comprise an objective lens or a mirror that alters a light path and refracts or reflects an optical axis of the optical device 200 intersected with the center axis of the projection lens system 700 at a proper incident angle.

The DMD 600 used as a display device comprises pixels having a plurality of fine mirrors arranged two-dimensionally. The DMD 600 drives inclinations of the mirrors at first and second angles according to a function of an electrostatic field in a memory device correspondingly arranged to each pixel by a using micro eletro mechanical system (MEMS) technique and alters the angle of reflected light to control an on/off state of light. The DMD 600 responds at a higher speed than other display devices, thereby providing images effectively.

The projection lens system 700 is provided as a plurality of lenses and the like to enlarge and project the image implemented by the DMD 600.

The screen 800 has a substantially rectangular shape and displays the image thereon.

Figure 7:
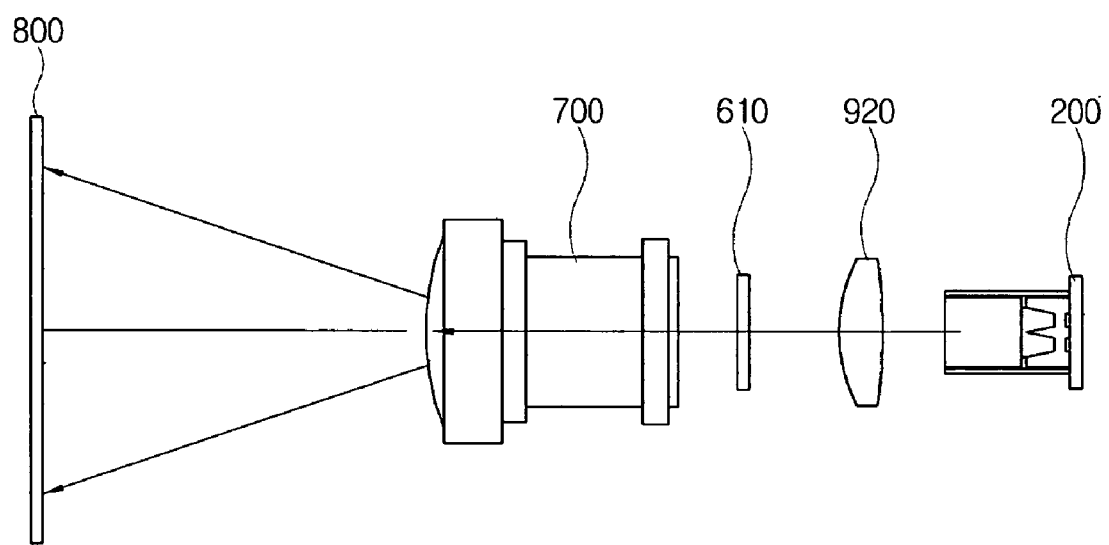
FIG. 7 is a schematic view of another projection system comprising the optical device according to the second exemplary embodiment of the present invention.

FIG. 7 is a schematic view of another projection system comprising the optical device according to the second exemplary embodiment of the present invention. The projection system according to the second exemplary embodiment comprises the liquid crystal display (LCD) 610 as the display device.

For the LCD 610, the optical device 200 is provided behind the LCD 610 because light must be supplied in back of the LCD 610. Also, a collimator 920 is provided between the LCD 610 and the optical device 200 to make light parallel light.

Figure 8:
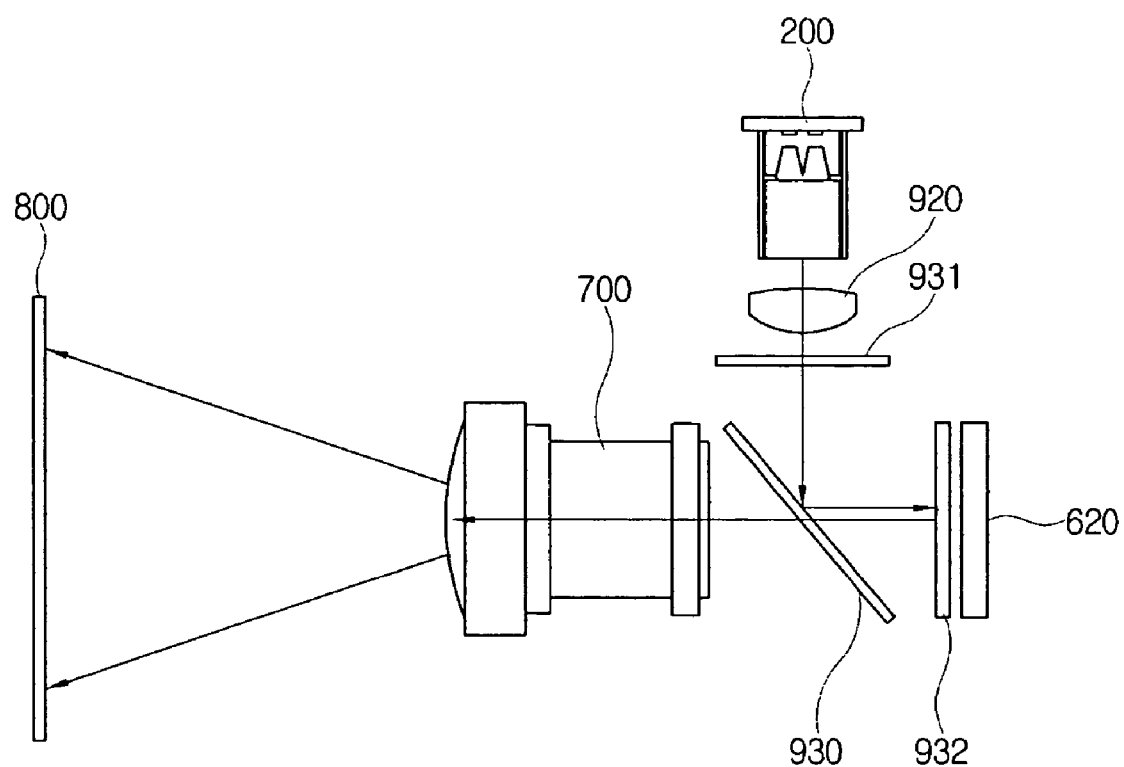
FIG. 8 is a schematic view of still another projection system comprising the optical device according to the second exemplary embodiment of the present invention.

FIG. 8 is a schematic view of another projection system comprising the optical device according to the second exemplary embodiment of the present invention. A display device according to the present exemplary embodiment is a liquid crystal on silicon (LCOS) device 620. A light direction controller comprises a polarization divider 930, a linear polarization apparatus 931 and a phase shift part 932 that shifts a light phase as much as $\lambda/4$.

The LCOS device 620 is characterized in using an LCD panel having a silicon reflective type as compared with a conventional LCD panel. A screen of the reflective type is brighter than that of a transmission type. Recently, the reflective type has been developed for use in a conventional semiconductor process because liquid crystal is formed on silicon.

The polarization divider 930 induces an optical axis of the optical device 200 intersected in the center axis of the projection lens system 700 to a proper incident angle. Light polarized into one of a P wave and an S wave through the light direction controller having the polarization divider 930 is provided to the projection lens system 700. The polarization divider 930 may comprise a wire grid polarizer. The above polarization system may be constituted of the LCD device using a polarization of light.

Figure 9A:
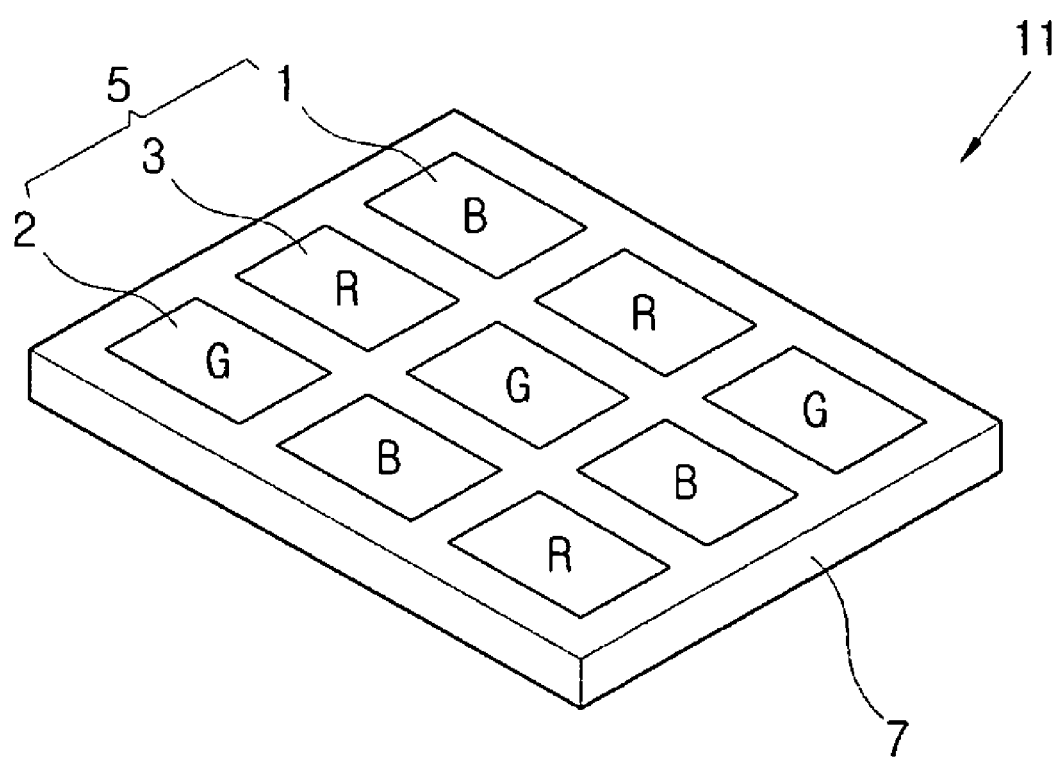
FIG. 9A is a perspective view of a light source unit according to a sixth exemplary embodiment of the present invention.
Figure 9B:
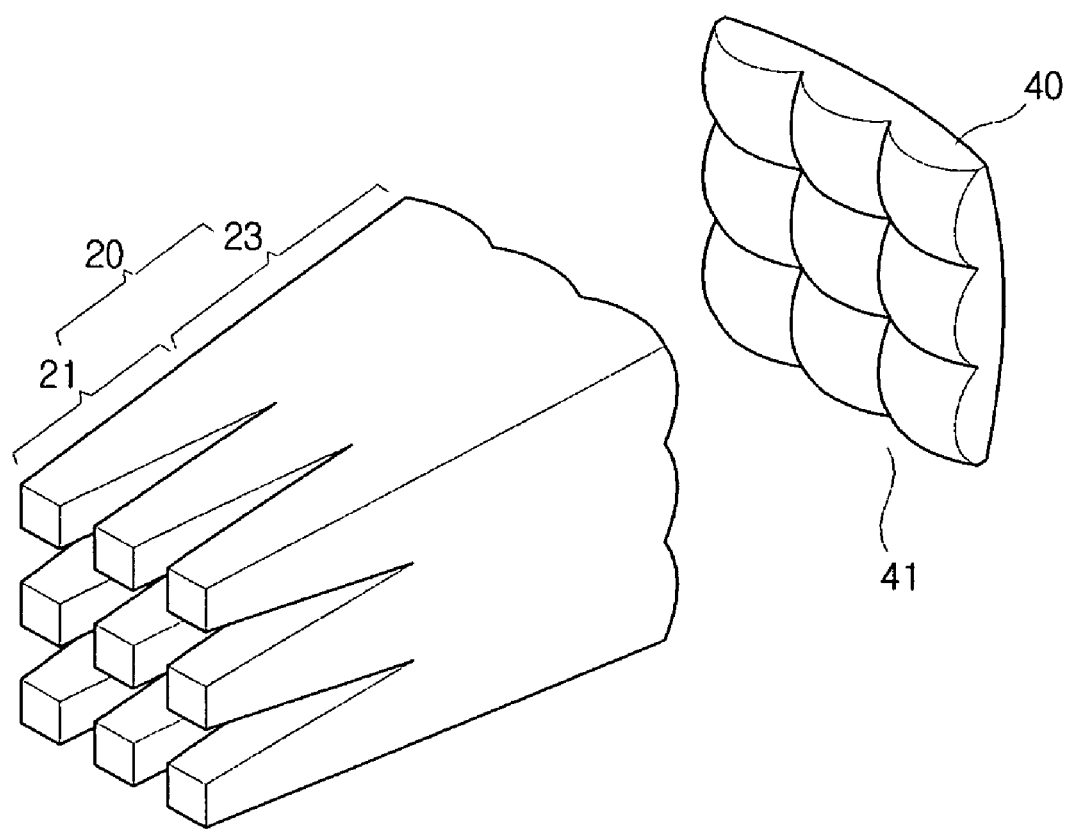
FIG. 9B is a perspective view of a light mixing unit according to the sixth exemplary embodiment of the present invention.
Figure 9C:
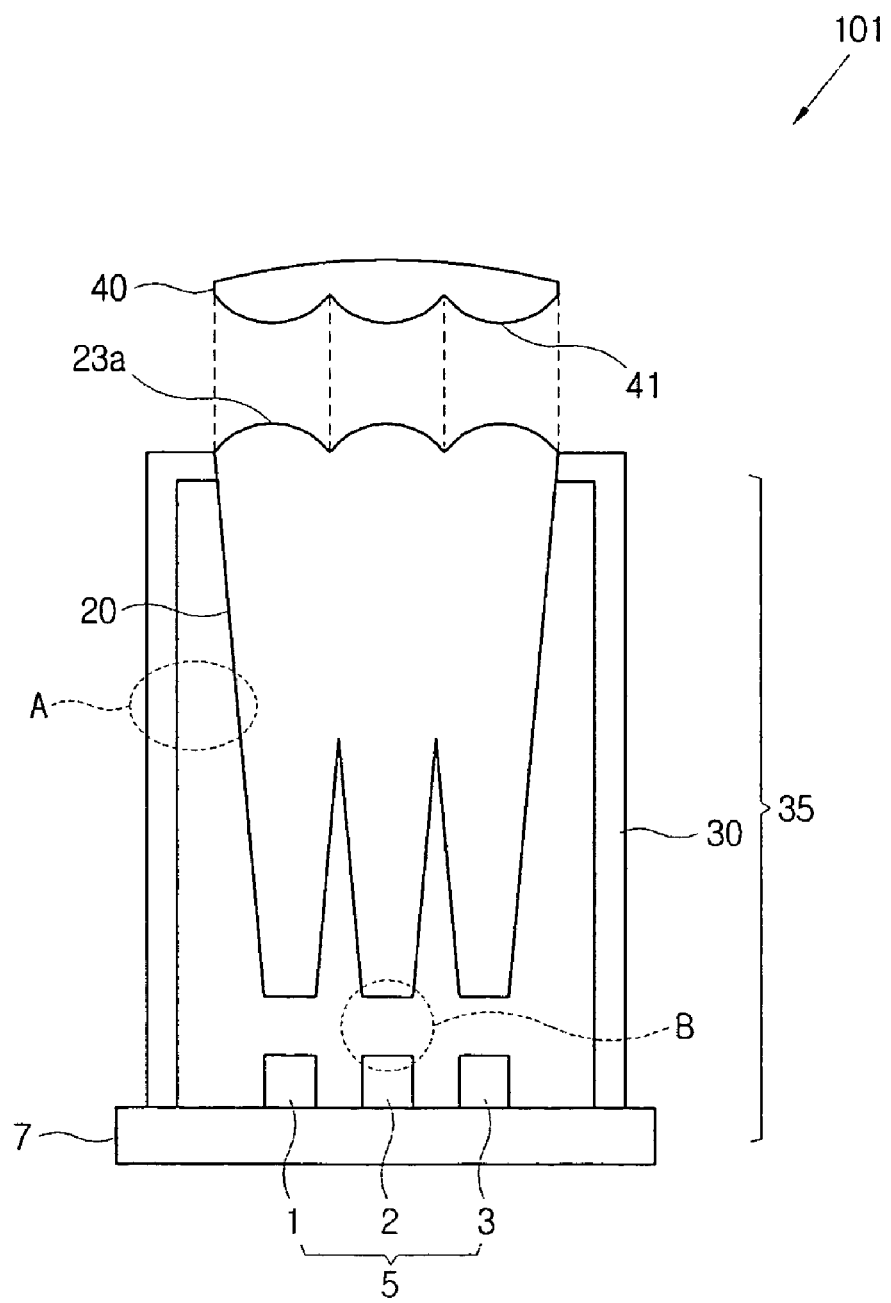
FIG. 9C is a schematic view of an optical device according to the sixth exemplary embodiment of the present invention.

An optical device according to a sixth exemplary embodiment of the present invention is described referring to the FIGS. 9A through 9C. FIG. 9A illustrates a light source unit 11. FIG. 9B illustrates a light mixing unit 20 and a second optical lens 40. FIG. 9C is a sectional view of an optical device 101. As shown therein, an optical device 101 according to the sixth exemplary embodiment of the present invention comprises a first optical lens 35 having the light source unit 10, the light mixing unit 20 and a supporter 30 supporting them, and the second optical lens 40 having a plurality of convexes 41.

The light source unit 11 comprises a plurality of light sources 5 and a light source circuit board 7 in which the plurality of light sources 5 are mounted. The light source unit 11 provides light having different colors to the light mixing unit 20.

The light source 5 comprises a blue light source 1 emitting blue light, a green light source 2 emitting green light and a red light source 3 emitting red light. The light source 5 is arranged in a 3×3 matrix type. Each of the light sources 1, 2 and 3 emits a different color and is provided in the same quantity. The green light sources 2 are arranged on a substantially diagonal line of the matrix and the red light source 3 and the blue light sources 1 are separately arranged in a substantially triangular shape. The plurality of light sources 5 are arranged such that each of the adjacent light sources 5 emits a different color, thereby mixing the emitted light. Accordingly, the plurality of light sources 5 having different colors to one another are arranged on one column or one row, but the arrangement is not limited thereto.

The light mixing unit 20 is substantially similar to the light missing unit 20 of the first exemplary embodiment. Therefore, repetitive descriptions thereof will be avoided as necessary.

A plurality of convexes 23*a* are formed on an emitting surface of the light mixing part 23, as shown in FIG. 9C. The convexes 23*a* allow light to travel to a desired area of the second optical lens 40.

The second optical lens 40 is preferably a fly-eye lens collecting light emitted from the light mixing part 23*a*. A plurality of convexes 41 are formed in an incident surface of the second optical lens 40 to substantially correspond to the convexes 23*a* of the light mixing part 23. The plurality of convexes 23*a* and 41 are formed to substantially correspond to the light source 5, thereby enhancing a light collecting efficiency. The optical device 101 according to an exemplary embodiment of the present invention guides light emitted from each light source 5 to the convexes 23*a* of the light mixing part 23 and the convexes 41 of the second optical lens 40, and then transmits the emitted light to an external optical device as requested.

FIG. 9C is a sectional view of the optical device 101. The supporter 30 supports the light source unit 11 and the light mixing unit 20.

Figure 10:
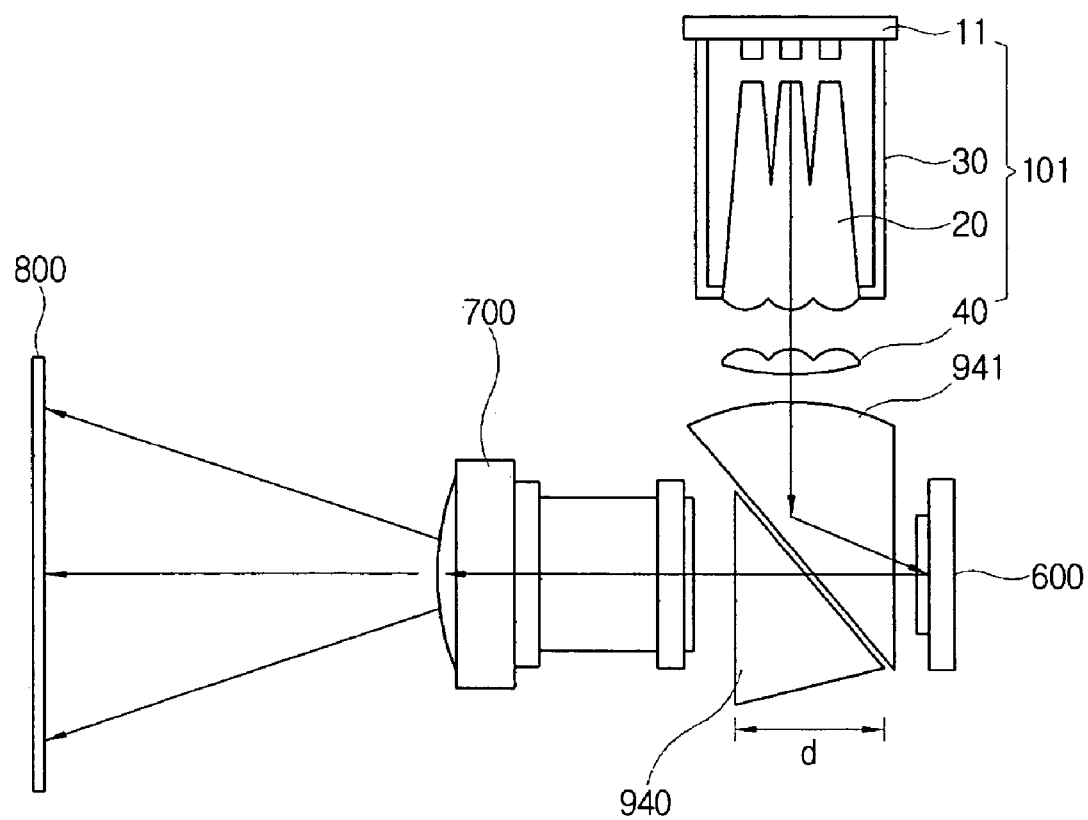
FIG. 10 is a schematic view of a projection system comprising the optical device according to the sixth exemplary embodiment of the present invention.

FIG. 10 is a schematic view of a projection system comprising the optical device 101 according to the sixth exemplary embodiment of the present invention. The projection system preferably has a display device comprising one of a digital micromirror device (DMD), a liquid crystal on silicon (LCOS) device and a liquid crystal display (LCD) device.

As shown in FIG. 10, the projection system comprises the optical device 101, a digital micromirror device (DMD) 600 as a display device, a light direction controller 940, a projection lens system 700 and a screen 800.

The optical device 101 is illustrated in FIG. 9 and a redundant explanation thereof is therefore omitted. Light emitted from the optical device 101 is provided to the DMD 600 through the light direction controller 940.

The light direction controller 940 guides the light emitted from the optical device 101 to the DMD 600 and transfers an image implemented by the DMD 600 to the projection lens system 700. The light direction controller 940 comprises a total reflective prism of which an incident surface 941 is preferably convex. The total reflective prism is used so that back focus length (BFL) of the projection lens system 700 decreases as much as a thickness 'd' of the total reflective prism over a refractive index n of the total reflective prism. Because light passes through denser matter than air, a light path decreases such that a more compact projection system may be implemented. The light direction controller 940 is not limited to the total reflective prism, and may comprise an objective lens and/or a mirror that alters a light path and refracts or reflects an optical axis of the optical device 101 intersected with the center axis of the projection lens system 700 at proper incident angle.

The foregoing projection systems are spatial light modulators using the display devices 600, 610 and 620. Also, the projection systems may comprise an objective lens, an eyepiece, a condensing lens or a plurality of collimators for increasing the light efficiency that corresponds to each display device.

Hereinafter, elements of the aforementioned optical devices 100 through 500 and the projection systems will be briefly summarized. The light sources 5, 55 and 75 included in the optical device may have a various arrangement in two dimensions. Also, an incident surface of the light guiding parts 21, 41 and 61 is formed to substantially correspond to the arrangement of the light sources 5, 55 and 75. The light guiding parts 21, 41 and 61 are diverged by the light source, but are not limited thereto. Light guided from the light guiding parts 21, 41 and 61 is mixed at the light mixing parts 23, 24, 43 and 63. The light mixing parts 23, 24, 43 and 63 may form a single body with the light guiding parts 21, 41 and 61. The light tunnel having the mirror 24*b* may be constituted of the light mixing parts 23, 24, 43 and 63. The light guiding parts 21, 41 and 61 and the light mixing parts 23, 24, 43 and 63 may be provided as the pillar or the polygonal pillar and is also formed in the circular truncated cone or the polygonal truncated cone. The lateral side of the light mixing unit 20 is spaced from the supporter 30. The light source units 10, 50 and 70 are spaced from the light mixing units 20, 40 and 60 at a predetermined interval. Furthermore, the light fixing units may comprise a light tunnel part 80 contacted with the light source unit 70.

The projection system uses the aforementioned optical device as the light source system and the illuminating system. Also, the DMD, the LCOS device and the LCD device may be used as the display device.

It will be apparent to those skilled in the art that various modifications and variation may be made in the present invention without departing from the spirit or scope of the invention.

As described above, the present invention provides a small-sized optical device having an enhanced light efficiency and a projection system comprising the same.

Also, the present invention provides an optical device having a reduced manufacturing cost and a projection system comprising the same.

What is claimed is:

1. An optical device, comprising:
a light source unit comprising a plurality of light sources;
a light mixing unit comprising a light guiding part for guiding light emitted from each light source and a light mixing part for mixing the guided light; and
a supporter for supporting the light mixing unit to be spaced from the light source unit, at least a portion of the light mixing unit being disposed within the supporter, the supporter being contacted with an upper edge of the light mixing unit and being spaced from the lateral side thereof to be connected with the light source unit.

2. The optical device according to claim 1, wherein the light guiding part forms a single body with the light mixing part.

3. The optical device according to claim 1, wherein the light guiding part comprises a plurality of incident surfaces corresponding to each light source.

4. The optical device according to claim 1, wherein the light guiding part comprises an incident surface in which an aperture is formed.

5. The optical device according to claim 1, wherein the light guiding part has a tapered shape.

6. The optical device according to claim 1, wherein the light guiding part is shaped like one of a circular truncated cone shape and a polygonal truncated cone.

7. The optical device according to claim 1, wherein a concave part having one of a circular cone shape and a polygonal cone shape is formed on an incident surface of the light guiding part.

8. The optical device according to claim 1, wherein the light mixing part comprises one of a pillar shape, a polygonal pillar shape, a circular truncated cone shape and a polygonal truncated cone shape.

9. The optical device according to claim 1, wherein the light mixing part comprises an air layer.

10. The optical device according to claim 1, wherein the light mixing part further comprises a mirror from which light is reflected.

11. The optical device according to claim 1, wherein the light mixing part comprises at least one of polymetamethylacrylate (PMMA) and polycarbonate (PC).

12. The optical device according to claim 1, wherein the light source unit comprises a red light source, a blue light source and a green light source.

13. The optical device according to claim 12, wherein the light sources are arranged in a substantially circular or polygonal shape.

14. The optical device according to claim 13, wherein the light sources are arranged in a rectangular shape and the number of the green light sources is as many as double that of the blue or red light sources.

15. The optical device according to claim 1, wherein the light source comprises one of a light emitting diode (LED) and a laser diode (LD).

16. The optical device according to claim 5, wherein the light guiding part tapers outwardly away from the light source unit.

17. The optical device according to claim 1, further comprising an optical lens for collecting light emitted from the light mixing unit.

18. The optical device according to claim 17, wherein a plurality of convexes are formed on an emitting surface of the light mixing unit and an incident surface of the optical lens.

19. An illuminating system for a projection system, comprising:
a light source;
a display device receiving light from the illuminating system and implementing an image;
a projection lens system enlarging and projecting the implemented image by the display device;
a screen displaying the projected image; and
an optical device comprising
a light source unit comprising a plurality of light sources;
a light mixing unit comprising a light guide part for guiding light emitted from each light source and a light mixing part for mixing the guided light; and
a supporter for supporting the light mixing unit to be spaced from the light source unit, at least a portion of the light mixing unit being disposed within the supporter, the supporter being contacted with an upper edge of the light mixing unit and being spaced from the lateral side thereof to be connected with the light source unit.

20. The illuminating system according to claim 19, wherein the display device comprises one of a DMD, an LCOS device and an LCD device.

21. The illuminating system according to claim 19, further comprising a light direction controller for guiding light entering into the illuminating system to the display device and transferring an image implemented by the display device to the projection lens system.

22. The illuminating system according to claim 21, wherein the display device is a DMD, and the light direction controller comprises at least one of a total reflective prism, an objective lens and a mirror.

23. The illuminating system according to claim 21, wherein the display device comprises one of an LCD device and an LCOS device, and the light direction controller comprises a light polarization divider.

24. The illuminating system according to claim 21, wherein the light direction controller further comprises a collimator disposed in front of the display device.

25. An optical device, comprising:
a supporter;
a light source unit having a plurality of light sources, the light source unit being connected to the supporter; and
a light mixing unit having a light guiding part for guiding light emitted from each light source and a light mixing part for mixing the guided light, the light mixing unit being connected to the supporter such that the light mixing unit is spaced from the light source unit, and the supporter being contacted with an upper edge of the light mixing unit and being spaced from the lateral side thereof to be connected with the light source unit.

26. An illuminating system for a projection system, comprising:
a light source;
a display device receiving light from the light source and implementing an image;
a projection lens system enlarging and projecting the implemented image by the display device;
a screen displaying the projected image thereon; and
an optical device including
a light source unit comprising a plurality of light sources;
a light mixing unit comprising a light guiding part for guiding light emitted from each light source and a light mixing part for mixing the guided light; and
a supporter connected to the light source unit for supporting the light mixing unit to be spaced from the light source unit, the supporter being contacted with an upper edge of the light mixing unit and being spaced from the lateral side thereof to be connected with the light source unit.

* * * * *